United States Patent
El Assaad

(10) Patent No.: US 12,441,373 B2
(45) Date of Patent: Oct. 14, 2025

(54) VEHICLE, INFRASTRUCTURE COMPONENT, APPARATUS, COMPUTER PROGRAM, AND METHOD FOR A VEHICLE

(71) Applicant: VOLKSWAGEN AKTIENGESELLSCHAFT, Wolfsburg (DE)

(72) Inventor: Ahmad El Assaad, Wolfsburg (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 181 days.

(21) Appl. No.: 18/264,769

(22) PCT Filed: Feb. 9, 2022

(86) PCT No.: PCT/EP2022/053168
§ 371 (c)(1),
(2) Date: Aug. 9, 2023

(87) PCT Pub. No.: WO2022/171701
PCT Pub. Date: Aug. 18, 2022

(65) Prior Publication Data
US 2024/0124033 A1      Apr. 18, 2024

(30) Foreign Application Priority Data
Feb. 9, 2021    (EP) .................................. 21156143

(51) Int. Cl.
B60W 60/00    (2020.01)
B60W 50/00    (2006.01)
H04W 28/02    (2009.01)

(52) U.S. Cl.
CPC .... B60W 60/0059 (2020.02); B60W 50/0097 (2013.01); B60W 60/001 (2020.02);
(Continued)

(58) Field of Classification Search
CPC ........... B60W 60/0059; B60W 60/001; B60W 50/0097; B60W 2756/10; B60W 2556/45; H04W 28/0236
See application file for complete search history.

(56) References Cited

U.S. PATENT DOCUMENTS 5,307,271 A    4/1994   Everett, Jr. et al.
6,633,800 B1   10/2003  Ward et al.
(Continued)

FOREIGN PATENT DOCUMENTS

DE    102019204943 A1    10/2020
EP      3279053 A1         2/2018

OTHER PUBLICATIONS

Extended European Search Report; European Patent Application No. 21156143.6; Oct. 4, 2021.
(Continued)

Primary Examiner — Mohamad O El Sayah
(74) Attorney, Agent, or Firm — BARNES & THORNBURG LLP

(57) ABSTRACT

A transportation vehicle, infrastructure component, apparatus, computer program, and method for a transportation vehicle configured to be remotely operated by a remote driver in a remote driving mode and to be operated at least partially automatically in an automated driving mode. The method includes determining automated driving preferences of the transportation vehicle from driving behavior of the transportation vehicle, predicting information on a future traffic situation for switching from the remote driving mode to the automated driving mode, determining a predicted quality of service (pQoS) of a communication link to obtain a remote operation interval for which the transportation vehicle is at least operable in the remote driving mode, obtaining a handover duration for taking over control by the transportation vehicle for switching from the remote driving
(Continued)

mode to the automated driving mode, and deciding for or against switching from the remote driving mode to the automated driving mode.

23 Claims, 2 Drawing Sheets

(52) U.S. Cl.
CPC .... *H04W 28/0236* (2013.01); *B60W 2556/45* (2020.02); *B60W 2756/10* (2020.02)

(56) References Cited

U.S. PATENT DOCUMENTS

| | | | |
|---|---|---|---|
| 8,843,244 B2 | 9/2014 | Phillips et al. | |
| 9,464,410 B2 | 10/2016 | Johnson et al. | |
| 9,632,502 B1 | 4/2017 | Levinson et al. | |
| 2017/0038773 A1* | 2/2017 | Gordon | G08G 1/012 |
| 2018/0047091 A1* | 2/2018 | Ogden | G01C 21/3484 |
| 2018/0196426 A1* | 7/2018 | Kim | B61L 27/57 |
| 2019/0041225 A1* | 2/2019 | Winkle | H04W 48/16 |
| 2019/0049948 A1* | 2/2019 | Patel | G05D 1/0027 |
| 2020/0017124 A1* | 1/2020 | Camhi | B60W 60/0053 |
| 2020/0057436 A1* | 2/2020 | Boda | G08G 1/09 |
| 2020/0077278 A1 | 3/2020 | Jornod et al. | |
| 2020/0192360 A1 | 6/2020 | Zheng et al. | |
| 2020/0192386 A1* | 6/2020 | Stenneth | G01C 21/3697 |
| 2020/0218253 A1 | 7/2020 | Ramamurthy et al. | |
| 2021/0216066 A1* | 7/2021 | Shimotani | G05D 1/0011 |
| 2021/0331709 A1* | 10/2021 | Kim | A61B 5/1172 |
| 2022/0075366 A1 | 3/2022 | Blank et al. | |
| 2022/0413489 A1* | 12/2022 | Nakano | H04W 4/44 |

OTHER PUBLICATIONS

International Search Report; International Patent Application No. PCT/EP2022/053168; May 6, 2022.

* cited by examiner

VEHICLE, INFRASTRUCTURE COMPONENT, APPARATUS, COMPUTER PROGRAM, AND METHOD FOR A VEHICLE

PRIORITY CLAIM

This patent application is a U.S. National Phase of International Patent Application No. PCT/EP2022/053168, filed 9 Feb. 2022, which claims priority to European Patent Application No. 21156143.6, filed 9 Feb. 2021, the disclosures of which are incorporated herein by reference in their entireties.

SUMMARY

Illustrative embodiments relate to a transportation vehicle, an infrastructure component, an apparatus, a computer program, and a method for a transportation vehicle. In particular, illustrative embodiments relate to a concept for handover of control over a transportation vehicle when switching from remote driving mode to automated driving mode.

BRIEF DESCRIPTION OF THE DRAWINGS

Disclosed embodiments will be described in detail below with reference to the drawings, in which.

DETAILED DESCRIPTION

Figure 1:
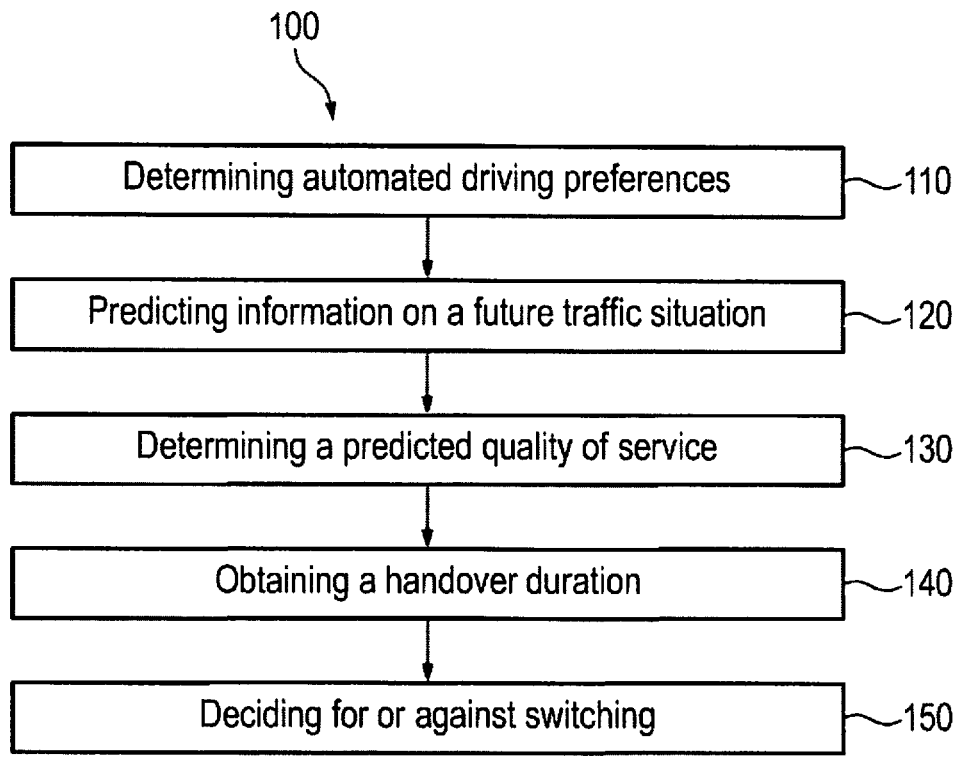
FIG. 1 illustrates a flowchart of an exemplary embodiment of a disclosed method for a transportation vehicle.

Several vehicle concepts provide for operating transportation vehicles in different modes for automated and remote driving, respectively. Remote driving is sometimes referred to as "tele-operated driving (ToD)". In such concepts, transportation vehicles, e.g., are operated at times in a remote driving mode where a remote driver operates the transportation vehicle from remote and at other times in an automated driving mode where the transportation vehicle is operated at least partially automatically. To this end, it may be desired to switch from the remote driving mode to the automated driving mode while driving and in a safe way. Switching from the remote driving mode to the automated driving mode, e.g., is necessary when a connectivity of a transportation vehicle to a remote control center operating the transportation vehicle from remote becomes insufficient for remote driving. One challenge in switching from the remote driving mode to the automated driving mode is to provide a safe and seamless handover of control over the transportation vehicle.

Document DE 10 2019 204943 A1 refers to a concept for teleoperated driving which provides for adjusting the teleoperated driving based on a predicted quality of service of a communication connection between a transportation vehicle and a control center.

Document EP 3 279 053 A1 refers to an operator-evaluation system for an automated transportation vehicle which includes a traffic-detector and a controller. The traffic-detector is used to determine a complexity-ranking of a traffic-scenario approached by a host-vehicle. The controller is in communication with the traffic-detector and is configured to operate the host-vehicle, depending on the complexity-ranking and a skill-ranking of an operator in an automated-mode, monitored mode, or manual mode.

Document US 2020/192360 A1 relates to a concept of determining a risk of operating a transportation vehicle in a current mode and switching modes.

Document US 2020/0077278 A1 relates to a method for predicting a quality of service for a communication between at least two moving communication partners, wherein the prediction is based on at least one link-based quality of service map that is updated in a link-based QoS map generation process.

Document US 2020/0218253 A1 relates to a concept for switching between teleoperation and autonomous operation of a control agent on a task by task basis and based on context for the agent. In particular, this document discloses a hybrid control system including the control agent and a control engine. The control engine is configured to install a master plan to the control agent. The master plan includes a plurality of high-level-tasks. The control agent is configured to operate according to the master plan, to obtain one or more low-level controls for the high-level tasks, and to perform the one or more low-level controls to realize the high level task. Also, the document proposes to adapt controls (e.g., for controlling a steering angle) in the teleoperation to controls in the autonomous operation in the transition for a smooth handover.

Document U.S. Pat. No. 5,307,271 discloses a control system for a remotely controlled transportation vehicle. The control system comprises a supervisory control system which receives supervisory speed and turn rate commands from a human operator which are provided to a servo-controlled transportation vehicle. Also, the control system comprises an obstruction detection system and a collision avoidance control system configured to disable the supervisory speed and turn rate commands when the obstruction detection system detects an obstruction to avoid the obstruction, and to enable the enable the supervisory speed and turn rate commands after the obstruction is avoided to return control to the human operator.

However, in applications of teachings from the documents, a control system of a transportation vehicle, which operates the transportation vehicle automatically, may have trouble to take over control in some situations, e.g., where the transportation vehicle needs to automatically perform complex maneuvers.

Hence, there may be a demand for an improved concept for transferring control of a transportation vehicle when switching from a remote driving mode to an automated driving mode of the transportation vehicle.

This demand may be satisfied by the subject-matter of the appended independent and dependent claims.

Disclosed embodiments are based on the finding that switching from a remote driving mode to an automated driving mode of a transportation vehicle is particularly safe when and/or where it is suitable for the transportation vehicle (e.g., for a system of the transportation vehicle which operates the transportation vehicle automatically) to take over control. In particular, a transition of control is safe when it happens seamlessly, i.e., when control over the transportation vehicle is transferred as long as remote driving is available.

Disclosed embodiments provide a method for a transportation vehicle configured to be remotely operated in a remote driving mode and to be operated at least partially automatically in an automated driving mode. The method comprises determining automated driving preferences of the transportation vehicle from driving behavior of the transportation vehicle. Also, the method comprises predicting information on a future traffic situation for switching from the remote driving mode to the automated driving mode based on the automated driving preferences. Further, the method comprises determining a predicted quality of service (pQoS) of a communication link for the remote driving mode to obtain, based on the predicted quality of service, a remote operation interval for which the transportation vehicle is at least operable in the remote driving mode. The method also comprises obtaining a handover duration for taking over control by the transportation vehicle for switching from the remote driving mode to the automated driving mode. Further, the method comprises deciding for (in favor of) or against (versus) switching from the remote driving mode to the automated driving mode based on the information on the future traffic situation, the remote operation interval, and the handover duration. The information on the future traffic situation, e.g., indicates when and/or where it is suitable, safe, and temporally manageable for the transportation vehicle to take over control. So, together with the pQoS this particularly allows to determine whether a transition of control is safe and temporally manageable while the transportation vehicle is operable in the remote driving mode to coordinate safe and/or to avoid unsafe transitions of control.

Predicting information on the future traffic situation may comprise predicting the information on the future traffic situation based on information on a current traffic situation, information on one or more present control commands of a remote driver operating the transportation vehicle in the remote driving mode, information on the remote driver, information on a planned route, and/or information on driving behavior of the remote driver. Existing concepts, e.g., allow to switch driving modes (e.g., from remote driving mode to automated driving mode) merely when the transportation vehicle stands still. The information on the current traffic situation, the planned route, the remote driver and/or on his or her driving behavior also allow to determine when and/or where the transportation vehicle can safely take over control from the remote driver while driving.

According to some exemplary embodiments, the handover duration comprises at least one of a reaction time of a remote driver operating the transportation vehicle in the remote driving mode, a communication latency of communication, and a reaction time of the transportation vehicle for switching from the remote driving mode to the automated driving mode. Thus, the handover duration allows a more profound decision for or against switching from the remote driving mode to the automated driving mode than, e.g., a default value for the handover duration.

In some exemplary embodiments, the method further comprises determining, based on the information on the future traffic situation, a handover time and/or handover place for switching from the remote driving mode to the automated driving mode within the remote operation interval. The handover time and/or the handover place, e.g., allow/s to coordinate processes at the transportation vehicle and a remote control center for operating the transportation vehicle from remote to provide a seamless transition of control in accordance with the handover time and/or handover place.

In some exemplary embodiments, predicting the future traffic situation comprises predicting the information on the future traffic situation based on a comparison of the automated driving preferences and one or more future traffic situations.

According to some exemplary embodiments, the automated driving preferences comprise one or more conditions for the traffic situation and deciding for or against switching from the remote driving mode to the automated driving mode comprises determining, based on the information on the future traffic situation, in the remote operation interval a period for which the future traffic situation fulfills the one or more conditions. Further, deciding for or against switching from the remote driving mode to the automated driving mode may comprise deciding for or against switching from the remote driving mode to the automated driving mode based on a comparison of the handover duration with the period. The conditions may prohibit switching in predefined traffic situations, e.g., while the transportation vehicle is going through a curve, a construction site, and/or when the transportation vehicle is in other situations challenging for automated driving. So, the conditions may allow a more secure handover of control over the transportation vehicle. Optionally, the conditions comprise conditions for an acceleration, deceleration, speed, steering angle of the transportation vehicle, distance to one or more surrounding transportation vehicles, and/or a road profile in the traffic situation which allow a more profound assessment of whether the future traffic situation is safe for switching from the remote driving mode to the automated driving mode than In some exemplary embodiments, the method further comprises causing the transportation vehicle or requesting a remote driver to adapt driving parameters affecting the future traffic situation to fulfill the conditions. In this way, a suitable future traffic situation for switching from the automated driving mode to the remote driving mode may be actively created or forced. This, e.g., comes into play when the driving behavior of the remote driver is mostly or generally irreconcilable with the automated driving preferences of the transportation vehicle in the automated driving mode. For example, if the remote driver has a more offensive general style of driving than the transportation vehicle in the automated driving mode and, e.g., generally drives faster and/or with less distance to other transportation vehicles than proposed or indicated by the automated driving preferences.

In further exemplary embodiments, determining the automated driving preferences of the transportation vehicle comprises determining automated driving preferences of the transportation vehicle from driving behavior for different levels of automation (LoA) of the transportation vehicle and deciding for switching from the remote driving mode to the automated driving mode comprises selecting a LoA for the automated driving mode based on the information on the future traffic situation and the automated driving preferences of the different LoA. This allows to select an appropriate LoA for the automated driving mode. The higher the LoA, the less a human driver intervenes. So, the higher the LoA, the more challenging may be complex traffic situations for automated driving. Some situations, so-called "deadlock situations", e.g., cannot be resolved, in a high LoA but only in lower LoA. The information on the future traffic situation, e.g., indicates how complex the future traffic situation is and, thus, which of the LoA are appropriate to maneuver the transportation vehicle in the future traffic situation for switching from the remote driving mode to the automated driving mode. Accordingly, the more complex the future traffic situation, the lower may be the selected LoA.

In some exemplary embodiments, the method is executed by the transportation vehicle.

Optionally, the method executed on a data processing circuit remote from the transportation vehicle. This allows to save resources (e.g., computing power, energy consumption) of the transportation vehicle.

In some exemplary embodiments, deciding against switching from the remote driving mode to the automated driving mode comprises deciding for switching from the remote driving mode to a manual driving mode of the transportation vehicle. Thus, a driver in the transportation vehicle can take over control of the transportation vehicle. So, this can prevent loss of control of the transportation vehicle, e.g., when remote driving is no longer available and a safe transition of control for switching to the automated driving mode is not manageable.

Other disclosed embodiments provide a computer program having a program code for performing at least one of the methods of the preceding claims, when the computer program is executed on a computer, a processor, or a programmable hardware component.

Further disclosed embodiments provide an apparatus comprising one or more interfaces for communication and a data processing circuit configured to control the one or more interfaces. Further, the data processing circuit and the one or more interfaces are configured to execute one of the methods proposed herein.

Other disclosed embodiments provide a transportation vehicle or an infrastructure component comprising the apparatus proposed herein.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed, or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be similarly interpreted.

The terminology used herein is for the purpose of describing particular disclosed embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes", or "including", when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Automated driving and remote driving play an increasingly important role in future mobility and transport services. Switching between driving modes for automated and remote driving can have several reasons: The transportation vehicle, e.g., is not able to handle a situation (so-called "deadlock situations") and/or an operational design domain (ODD) for remote driving does not fulfill predefined requirements, e.g., connectivity to a remote control center for remote driving is insufficient or lost. In some situations, where the transportation vehicle is operated in the remote driving mode, a connectivity to the remote control center may become insufficient for remote driving. Hence, the transportation vehicle may need to switch from the remote driving mode to the automated driving mode. One main challenge is to have a safe transition of control over the transportation vehicle when switching from the remote driving mode to the automated driving mode. Another challenge is to select an appropriate level of automation (LoA) when switching from the remote driving mode to the automated driving mode.

Hence, there may be a demand for an improved concept for transferring control of a transportation vehicle when switching from a remote driving mode to an automated driving mode of the transportation vehicle.

FIG. 1 illustrates a flowchart of an exemplary embodiment of a method 100 for a transportation vehicle configured to be remotely operated in a remote driving mode and to be operated at least partially automatically in an automated driving mode. The transportation vehicle can be a car, a bus, a truck, or the like. For the remote driving mode, the transportation vehicle may communicate with a remote control center which exhibits equipment for a remote driver to control the transportation vehicle from remote. The remote operator, thus, can have full or at least partial control over the transportation vehicle and, e.g., maneuver the transportation vehicle, accelerate, decelerate, steer, and/or one or more functions (e.g., the electronic stability control, ESC, the anti-lock braking system, ABS, and/or the like) in the remote driving mode. Thus, a passenger or driver in the transportation vehicle may not need to maneuver the transportation vehicle himself or herself in the remote driving mode. In the remote driving mode, the transportation vehicle, e.g., monitors its environment using one or more (various) sensors (e.g., camera/s, lidar sensor/s, radar sensor/s, and/or the like) to provide the remote operator with information from the sensors, e.g., on a course of a road and/or traffic events in the environment to enable the remote operator to maneuver the transportation vehicle. In the automated driving mode, the transportation vehicle operates fully or partially automatically and/or autonomously. So, the transportation vehicle can be understood as a fully pr partly automated/autonomously driving transportation vehicle. Also, the transportation vehicle may be configured to be "manually" operated, i.e., by a (manual) driver in the transportation vehicle, in an manual driving mode.

In some scenarios, it is predicted that remote driving becomes unavailable, e.g., in view of an upcoming tunnel where a communication with the remote control center becomes unavailable due to a lost or insufficient communication link to the remote control center. Thus, it may be desired or necessary to switch from the remote driving mode to the automated driving mode. Also, other reasons, e.g., a request of the remote driver or the driver in the transportation vehicle can make it necessary or desirable to switch from the remote driving mode to the automated driving mode. Method 100 provides a concept for doing this safely and seamlessly and to avoid unsafe and/or seamless transitions of control.

As can be seen from the flow chart, method 100 comprises determining 110 automated driving preferences of the transportation vehicle from driving behavior of the transportation vehicle (in the automated driving mode).

The driving behavior can be understood as a manner of driving of the transportation vehicle in the automated driving mode.

To determine the driving behavior, data related to the driving behavior may be collected in the automated driving mode. The data, e.g., comprises information on the transportation vehicle like, e.g., information on an acceleration (in 2D or 3D if available), speed/velocity (in 2D or 3D if available), steering angle, distance to one or more other transportation vehicles, a location of the transportation vehicle, and/or a road profile and/or geometry of a road travelled by the transportation vehicle. Accordingly, the driving behavior may be obtained from the collected data. The road profile, e.g., is indicative of a course of a road travelled by the transportation vehicle.

In particular, the driving behavior may depend on a level of automation for automated driving. So, the data may also comprise information on a level of automation (LoA) in the automated driving mode for determining automated driving preferences for different LoA. The transportation vehicle, e.g., has various LoA for automated driving. The LoA are, e.g., indicative of an amount of driver intervention and attentiveness which is required and/or which tasks the transportation vehicle performs automatically in a respective LoA. The LoA may be classified according to the J3016 standard of the Society of Automotive Engineers (SAE). Optionally, the LoA are classified differently. Thus, the driving behavior can be associated with the different LoA. This allows to obtain specific automated driving preferences, e.g., different sets of automated driving preferences for different LoA. In some exemplary embodiments, the automated driving preferences are determined by the transportation vehicle. To save resources of the transportation vehicle, the automated driving preferences are optionally determined remote from the transportation vehicle, e.g., by an infrastructure component. The data can be collected and transmitted to the infrastructure component with the same rate of cooperative awareness messages of the transportation vehicle. So, the rate may depend on the speed/velocity of the transportation vehicle. The higher the velocity, the higher may be the rate for a more accurate determination of the automated driving preferences.

To provide the infrastructure component with the collected data, the transportation vehicle and/or the infrastructure component, e.g., communicate via a communications network. The communications network may use one or more arbitrary communication technologies and/or standards to communicatively connect the transportation vehicle, the remote control center, and/or the infrastructure component. In particular, the communications network may be a mobile communications network. The (mobile) communications network may, for example, be or comprise an Orthogonal Time Frequency Space (OTFS) system or one of the Third Generation Partnership Project (3GPP)-standardized mobile communications networks. The communications network may correspond to or comprise a mobile communication system of the 4th or 5th Generation (4G, 5G) and may use mm-Wave technology. The communications network may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communications networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

The infrastructure component, e.g., comprises or corresponds to a cloud system in the mobile communications network. In some exemplary embodiments, the collected data is processed using an appropriately trained artificial intelligence (AI) algorithms for determining the driving behavior and/or the automated driving preferences from the collected data.

The automated driving preferences, e.g., are indicative of a function, a mean, a maximum, or a minimum value for the velocity, the acceleration, steering angle, and/or the distance to other transportation vehicles. The automated driving preferences can be defined such that they indicate under which circumstances, e.g., for which speed, acceleration, distance to other transportation vehicles, and/or road profile it is safe for the transportation vehicle to take over control for autonomous/automated driving. The automated driving preferences can be also understood as "driving capabilities" of the transportation vehicle which represent circumstances under which the transportation vehicle is able to take over the control safely. Although the present disclosure is limited to the velocity, the acceleration, steering angle, and/or the distance to other transportation vehicles, it is noted that also one or more other or further criteria may be used to determine and/or represent the automated driving preferences.

In some exemplary embodiments, the driving behavior is defined by one or more predefined or default parameters or thresholds to which the transportation vehicle adheres in the automated driving mode. The parameters or thresholds, e.g., are indicative of bounds for the transportation vehicle's velocity, acceleration, and/or distance to other transportation vehicles.

Also, method 100 comprises predicting 120 information on a future traffic situation for switching from the remote driving mode to the automated driving mode based on the automated driving preferences. In context of the present disclosure, the (future) traffic situation can be understood as a momentary or temporary scene to which the transportation vehicle is exposed. Accordingly, the future traffic situation for switching from the automated driving mode to the remote driving mode can be understood as a momentary or temporary scene for which it may be convenient for the transportation vehicle to take over control with respect to the automated driving preferences. To determine the future traffic situation for switching from the remote driving mode to the automated driving mode, one or multiple estimated/predicted future traffic situations can be compared with the automated driving preferences. In particular, future traffic situations may be predicted based on information on a current traffic situation, information on one or more present control commands of a remote driver operating the transportation vehicle in the remote driving mode, information on the remote driver, information on a planned route, and/or information on driving behavior of the remote driver. The future traffic situation, e.g., is convenient/suitable for switching from the remote driving mode to the automated driving mode with regard to the automated driving preferences if the future traffic situation is reconcilable with the automated driving preferences. This, e.g., is the case if/when the transportation vehicle's acceleration, velocity, steering angle, and/or distance to other transportation vehicles in the future traffic situation differs no more than by a predefined deviation from the automated driving preferences. Also, the automated driving preferences may prohibit to switch from the remote driving mode to the automated driving mode while the transportation vehicle accelerates, brakes, turns, and/or is going through curves, construction sites, and/or other traffic situations which are challenging in automated driving. In practice, the information on the future traffic situation may be indicative of a time, a time interval, a position, and/or an area/road section where and/or when it is safe and/or convenient for the transportation vehicle to take over control. Also, the information on the future traffic situation may relate to multiple future traffic situations and, e.g., indicates multiple times, time intervals, positions, and/or areas/road sections where and/or when it is safe and/or convenient for the transportation vehicle to take over control.

The information on the planned route may be indicative of a road profile, road conditions, a course of the road, and/or locations where the transportation vehicle accelerates, turns, decelerates, or stops. So, the planned route as well as the information on a current traffic situation, information on one or more present control commands, on the remote driver (e.g., age, gender, etc.), and/or information on driving behavior of the remote driver may indicate when, where, the remote driver drives how fast, when and/or where the transportation vehicle is going through curves, construction sites, and/or how the remote driver accelerates, brakes, stops, turns, etc. It is a finding that it may be unsafe for the transportation vehicle to take over the control while the transportation vehicle accelerates, brakes, and/or turns. Accordingly, the future traffic situation may be a situation where the remote driver does not brake, accelerate, and/or change the direction of the transportation vehicle (too much). Thus, the information on the future traffic situation may bin indicative of a future traffic situation where and/or when the remote driver does not accelerate, brake, and/or turn according to the information on the remote driver and/or on his or her driving behavior, and/or the information on the planned route.

Further, method 100 comprises determining 130 a predicted quality of service (pQoS) of a communication link for the remote driving mode to obtain, based on the predicted quality of service, a remote operation interval for which the transportation vehicle is at least operable in the remote driving mode. The pQoS is, e.g., determined from a history of a quality of service (QoS) of the communication link and/or a location of the transportation vehicle. For example, it is known from the history that in preceding situations where the transportation vehicle entered a tunnel the QoS and/or the communication link worsens such that remote driving is not possible for a time in the tunnel. Thus, the pQoS can be determined from the location of the transportation vehicle and the history. The pQoS also may be determined in another way, e.g., from a past development of the QoS. The pQoS, e.g., allows to predict the remote operation interval for which the pQoS is sufficient for remote driving. The remote operation interval, e.g., is indicative of an area, a time, and/or a time interval for which a quality of service (e.g. data rate, latency, etc.) is sufficient for remote driving. The remote operation interval, e.g., is indicative of a time interval or road section when or where the pQoS is sufficient for remote driving between tunnels or other locations where the pQoS is insufficient.

Method 100 also comprises obtaining 140 a handover duration for taking over control by the transportation vehicle for switching from the remote driving mode to the automated driving mode. The handover duration comprises, e.g., communication latencies, processing latencies, and/or reaction times for transferring the control from the remote control center to the transportation vehicle, e.g., to a control system of the transportation vehicle for automated driving. The reaction times, e.g., comprise a reaction time of a remote driver operating the transportation vehicle in the remote driving mode, and/or a reaction time of the transportation vehicle for switching from the remote driving mode to the automated driving mode. The reaction time of the remote driver, e.g., is a duration that the remote driver takes to orchestrate the switching in response to a request to switch to automated driving. The reaction time of the transportation vehicle, e.g., is a duration that the transportation vehicle takes to take over the control. The handover duration, e.g., is a predefined duration or derived from previous measurements of it.

Also, method 100 comprises deciding 150 for or against switching from the remote driving mode to the automated driving mode based on the information on the future traffic situation, the remote operation interval, and the handover duration. The information on the future traffic situation, the remote operation interval, and the handover duration allow to determine whether, where, and/or when a safe and seamless transition of control over the transportation vehicle is manageable. Accordingly, it is decided for switching from the remote driving mode to the automated driving mode if a safe and seamless transition is manageable and decided against the switching otherwise.

In some exemplary embodiments, deciding 150 for switching from the remote driving mode to the automated driving mode comprises selecting a LoA for the automated driving mode based on the information on the future traffic situation and the automated driving preferences of the different LoA.

In some exemplary embodiments, the automated driving preferences comprise one or more conditions (e.g., for an acceleration, deceleration, speed, steering angle of the transportation vehicle, distance to one or more surrounding transportation vehicles, and/or a road profile in the future traffic situation for the future traffic situation) to be safe for switching from the remote driving mode to the automated driving mode. The automated driving preferences can also prohibit switching from the remote driving mode to the automated driving mode while going through a curve a construction site or other traffic areas which are challenging for automated driving. In such disclosed embodiments, deciding for or against switching from the remote driving mode to the automated driving mode may comprise determining in the remote operation interval, based on the information on the future traffic situation, a period for which the future traffic situation fulfills the one or more conditions and, thus, a safe and seamless handover provided that the handover is manageable within this period. Accordingly, it may be decided for or against switching from the remote driving mode to the automated driving mode based on a comparison of the handover duration with the period. For example, if the period is long enough, i.e., longer than or equal to the handover duration, a safe handover is manageable, so it is decided in favor of switching from the remote driving mode to the automated driving mode. Otherwise, if the period is too short, i.e., shorter than the handover duration, it is decided against switching from the remote driving mode to the automated driving mode to avoid an unsafe handover.

Optionally, the conditions correspond to or comprise conditions for the acceleration, the deceleration, the velocity of the transportation vehicle, a steering angle, the road profile, and/or the distance to one or more other transportation vehicles in the environment of the transportation vehicle and, e.g., are defined such that it is safe for the transportation vehicle to take over control of the transportation vehicle if one, multiple, or all of the conditions are fulfilled for a future traffic situation. The conditions, e.g., are indicative of respective ranges and/or thresholds for the acceleration, the deceleration, the velocity, and/or the distance. The thresholds may be expressed by:

a maximum speed bound;
a maximum acceleration bound; and/or
a minimum bound for a distance to one or more other transportation vehicles in the environment of the transportation vehicle.

To coordinate the transportation vehicle and the remote control center, the proposed concept may also provide for determining a handover time and/or a handover place for switching from the automated driving mode to the remote driving mode. Thus, the remote control center and the transportation vehicle can coordinate their timing for switching from the automated driving mode to the remote driving mode using the handover time and/or handover place. The transportation vehicle, e.g., gives up and the remote control center takes over the control of the transportation vehicle at the handover time and/or the handover place.

In some scenarios, the above conditions are not expected to be met as long as switching to the automated driving mode is manageable before remote driving becomes unavailable, e.g., since the remote driver generally drives faster and/or with less distance to other transportation vehicles than it is reconcilable with the automated driving preferences of the transportation vehicle in the automated driving mode. Therefore, the proposed concept may provide for causing the transportation vehicle or requesting the remote driver to adapt driving parameters affecting the future traffic situation to fulfill the conditions. The driving parameters, e.g., are indicative of parameters affecting the velocity, the acceleration, the deceleration, a travel direction, steering angle, and/or the like. For requesting the remote driver to adapt the driving parameters, e.g., a message can be transmitted to the driver requesting him or her to brake, accelerate, and/or steer. For causing the transportation vehicle to adapt the driving parameters, the transportation vehicle or the control system of the transportation vehicle may be instructed to brake, accelerate, and/or steer.

Method 100 of, e.g., is executed on a data processing circuit remote from the transportation vehicle. The data processing circuit may be communicatively coupled to the transportation vehicle to communicate information related to the pQoS, the driving behavior, the handover duration, and/or the future traffic situation from the transportation vehicle to the data processing circuit and to communicate the decision for or against switching from the remote driving mode to the automated driving mode to the transportation vehicle.

The above will be explained in more detail below with reference to an exemplary scenario. The transportation vehicle, e.g., is currently going through a curve and plans to enter a tunnel after a (short) straight behind the curve. In the tunnel, the QoS may become insufficient for remote driving. Thus, it may be desired to switch to the automated driving mode and the remote operation interval may expire at a point in time or a position when or where the QoS becomes insufficient when entering the tunnel. In this exemplary scenario, the information on the future traffic situation may suggest switching from the remote driving mode to the automated driving mode on the straight before entering the tunnel, as it may be challenging and/or unsafe for the transportation vehicle or its control system for automated driving to take over control while going through the curve. So, the information on the future traffic situation may indicate a point in time and/or place when and/or where the transportation vehicle enters the straight where the automated driving preferences allow to switch from the remote driving mode to the automated driving mode. The handover duration allows to determine whether the switching is manageable before the QoS becomes insufficient when the switching from the remote driving mode to the automated driving mode is not executed until the transportation vehicle enters the straight. For a safe transition of control over the transportation vehicle, it is decided for switching from the remote driving mode to the automated driving mode if the switching is manageable before the QoS becomes insufficient. Respectively, it is decided against switching from the remote driving mode to the automated driving mode if the switching is not manageable before the QoS becomes insufficient.

Although the above explanation relates to a specific exemplary scenario, the proposed concept may be also applied in other or various scenarios.

The proposed concept may be also implemented in a computer program or an apparatus.

Figure 2:
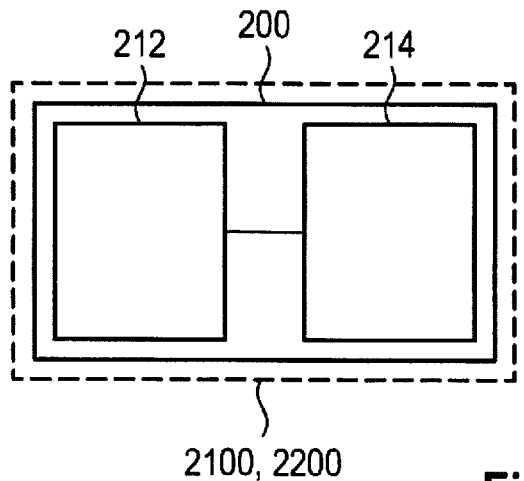
FIG. 2 schematically illustrates a block diagram an exemplary embodiment of a disclosed apparatus for implementing the proposed disclosure.

FIG. 2 illustrates a block diagram schematically illustrating an exemplary embodiment of an apparatus 200 for implementing the proposed concept.

Apparatus 200 comprises one or more interfaces 212 for communication and a data processing circuit 214 configured to control the one or more interfaces 212. The data processing circuit 214 and the one or more interfaces 212 are configured to execute one of the methods described herein.

In disclosed embodiments, the one or more interfaces 212 may correspond to any method or mechanism for obtaining, receiving, transmitting, or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 212 may comprise components to enable in accordance with an exemplary embodiment of method 100 communication for receiving information on the driving behavior, the transportation vehicle, other transportation vehicles and/or on information indicative of the pQoS and/or QoS. Such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 212 may be coupled to one or more antennas, which may correspond to any transmit and/or receive antennas, such as horn antennas, dipole antennas, patch antennas, sector antennas etc. In some examples the one or more interfaces 212 may serve the purpose of transmitting the decision for or against switching from the remote driving mode to the automated driving mode to the transportation vehicle and/or the remote control center.

As shown in FIG. 2 the one or more interfaces 212 are coupled to the data processing circuit 214 of the apparatus 200. In disclosed embodiments the communication circuit 214 may be implemented using one or more processing units, one or more processing devices, any method or mechanism for processing, such as a processor, a computer or a programmable hardware component being operable with accordingly adapted software. In other words, the described functions of the data processing circuit 214 may as well be implemented in software, which is then executed on one or more programmable hardware components. Such hardware components may comprise a general-purpose processor, a Digital Signal Processor (DSP), a micro-controller, etc.

As indicated by dashed lines, apparatus 200 is optionally implemented in a transportation vehicle 2100, e.g., in the above described transportation vehicle.

Optionally, the proposed concept is implemented in an infrastructure component 2200 remote from the transportation vehicle. Respectively, the method 100 may be executed on a data processing circuit (of the infrastructure component) remote from the transportation vehicle.

Figure 3:
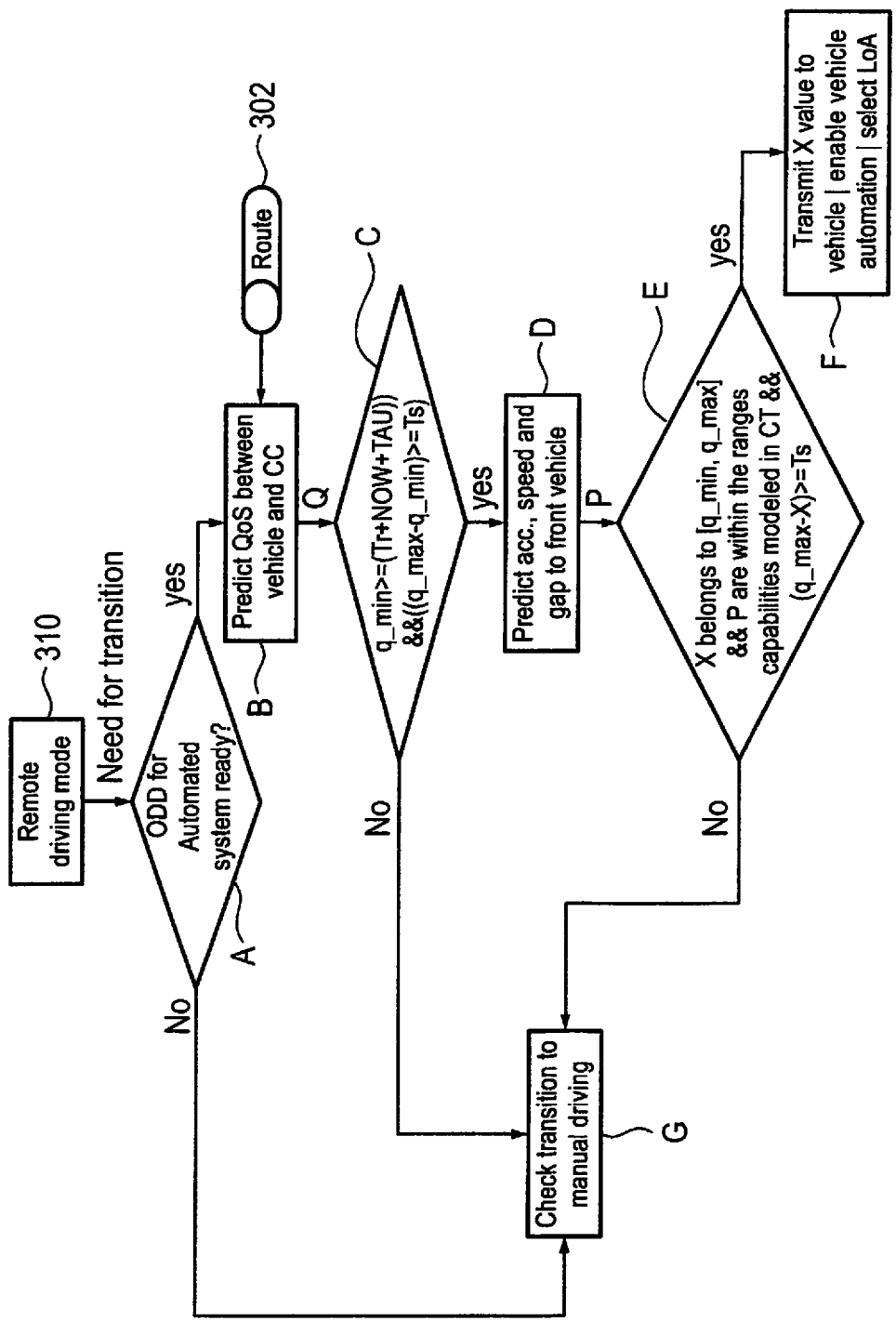
FIG. 3 schematically illustrates a flow chart of an application of the proposed disclosure.

FIG. 3 illustrates a flow chart schematically illustrating an application of the proposed concept.

The application described with reference to FIG. 3 may be (partially) implemented in an infrastructure component and/or the transportation vehicle. In the application described below, the proposed concept is implemented in an infrastructure component remote from the transportation vehicle to save resources of the transportation vehicle.

As can be seen from the flow chart, the transportation vehicle may be operated in an automated driving mode 310 in accordance with a predefined operational design domain (ODD). Then, a reason for switching from the remote driving mode to the automated driving mode may occur. The reason, e.g., relates to a predicted loss of connectivity to a remote control center for remote driving.

In operation at A, it is determined whether automated driving is available. For this, the transportation vehicle, e.g., checks whether its respective equipment for automated driving is operational. If automated driving is not available, operation at G may be executed where it is determined whether a transition to the manual driving mode is possible. If so, the transportation vehicle then may switch to the manual driving mode. Otherwise, if automated driving is available, operation at B may follow which comprises determining 130 the pQoS. For this, a planned route 302 of the transportation vehicle may be used. The planned route 302, e.g., indicates a path which the transportation vehicle will follow. Together with information on a spatial distribution of the QoS, the planned route allows to determine for the pQoS where and/or when the QoS is sufficient and/or when and/or where the QoS is insufficient. The information on the spatial distribution, e.g., is obtained from a history of the QoS with respect to a respective location of the transportation vehicle.

The pQoS allows to predict a time interval Q for which a communication link between the transportation vehicle and the remote control center provides sufficient QoS and which (Q) is specified by $Q=[q\_max-q\_min]$, wherein $q\_max$ denotes a point in time until which the QoS of the communication link is sufficient for remote driving according to the pQoS and $q\_min$ is indicative of the earliest point in time until which a remote driving session for operating the transportation vehicle in the remote driving mode can be closed. $q\_min$, e.g., is specified by $q\_min \geq Tr+NOW+TAU$, wherein TAU is indicative of a communication latency from "NOW" until an instruction for closing a tele-operation session with the remote control center arrives at the transportation vehicle and a request for closing the tele-operation session on the transportation vehicle side is triggered. Tr is indicative of a duration required to react on requests for closing tele-operation sessions by the control center.

In a subsequent operation at C, the time interval Q is compared to a handover duration Ts for taking over control by the transportation vehicle. If Q is shorter than Ts, then operation at G follows. Otherwise, if Q is equal to or larger than Ts, operation at D follows.

In operation at D, values P for acceleration, speed/velocity of the transportation vehicle, steering angle, and/or its distance to one or other transportation vehicles are determined using predefined motion models and/or information on the route 302 and/or on a current traffic situation to predict one or more future traffic situations and select, based on automated driving preferences CT, one or more a future traffic situation for switching to the automated driving mode based on automated driving preferences CT of different LoA and the values P. The information on the current traffic situation, e.g., comprises information on a current acceleration (2D or 3D if available), speed/velocity (2D or 3D if available), location of the transportation vehicle, and/or its current distance to one or more other transportation vehicles. The information on the future traffic situation, e.g., is indicative the values P, and of a handover time X for which the values P are reconcilable with CT. X, e.g., is indicative of the earliest time for which P are within the automated driving preferences for any LoA.

The automated driving preferences CT, e.g., are determined as described herein. As described above, the automated driving preferences, e.g., are indicative of ranges for the values P (acceleration, speed/velocity of the transportation vehicle, and/or its distance to one or other transportation vehicles) in the future traffic situations.

In a subsequent operation at E, it is determined, based on the information on the future traffic situation and Q, whether period $(q\_max-X)$ is longer or at least equal to Ts. In other words, it is checked whether a handover of control for switching from the remote driving mode to the automated driving mode is manageable within $(q\_max-X)$ in accordance with the handover duration Ts. If $(q\_max-X)$ is shorter than Ts, operation at H will follow. Otherwise, if $(q\_max-X)$ is longer or at least equal to Ts, operation at F follows.

In operation at F, X is transmitted to the transportation vehicle to enable the transportation vehicle to orchestrate the handover of control for switching from the remote driving mode to the automated driving mode, enable functions of the transportation vehicle for automated driving, and select based on the automated driving preferences CT and the information on the future traffic situation (e.g., values P) a suitable LoA whose automated driving preferences are reconcilable with the future traffic situation for switching from the remote driving mode to the automated driving mode.

The skilled person having benefit from the present disclosure will appreciate that for or in addition to the times or durations (e.g., X, Ts, Q) mentioned herein, alternatively or additionally, locations, areas, and/or road sections may be used for a location-based handover. Although the above application is implemented in the infrastructure component, the application may be also implemented in the transportation vehicle itself.

The aforementioned application, e.g., is applied to the above exemplary scenario or other scenarios, where switching from the remote driving mode to the automated driving mode is desired or necessary to provide a safe and seamless handover of control over the transportation vehicle. In particular, the concept proposed herein allows a safe and seamless handover while driving.

A person of skill in the art would readily recognize that operations of various above-described methods can be performed by programmed computers, for example, positions of slots may be determined or calculated. Herein, some exemplary embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The disclosed embodiments are also intended to cover computers programmed to perform the operations of methods described herein or (field) programmable logic arrays ((F)PLAs) or (field) programmable gate arrays ((F)PGAs), programmed to perform the operations of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed to furthering the art and are to be construed as being without limitation to such specifically recited examples and conditions. Moreover, all statements herein reciting principles, features, and embodiments of the disclosure, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

REFERENCE LIST 100 method for a transportation vehicle
110 determining automated driving preferences
120 predicting information on a future traffic situation
130 determining a pQoS
140 obtaining a handover duration
150 deciding for or against switching
200 apparatus
212 one or more interfaces
214 data processing circuit
302 planned route
310 remote driving mode
2100 transportation vehicle
2200 infrastructure component
A-G operations

The invention claimed is:

1. A method for a transportation vehicle configured to be remotely operated in a remote driving mode and to be operated at least partially automatically in an automated driving mode, the method comprising:
monitoring, in the remote driving mode, a current traffic situation using one or more sensors;
determining automated driving capabilities of the transportation vehicle based on data related to a driving behavior of the transportation vehicle collected in an automated driving mode, wherein the automated driving capabilities represent circumstances under which the vehicle is able to take over the control safely, wherein the determining of the automated driving capabilities of the transportation vehicle comprises determining automated driving capabilities of the transportation vehicle based on data related to the driving behavior for different levels of automation (LoA) of the transportation vehicle;
predicting a future traffic situation based on information on the current traffic situation using a predefined motion model;
comparing the future traffic situation with the automated driving capabilities of the transportation vehicle;
determining a predicted quality of service (pQoS) of a communication link for the remote driving mode to obtain, based on the predicted quality of service, a remote operation interval for which the transportation vehicle is at least operable in the remote driving mode;
obtaining a handover duration for taking over control by the transportation vehicle for switching from the remote driving mode to the automated driving mode; and
switching from the remote driving mode to the automated driving mode to control the transportation vehicle remotely, wherein the switching is based on the information on the future traffic situation, the remote operation interval, and the handover duration, wherein the switching from the remote driving mode to the automated driving mode comprises selecting a LoA for the automated driving mode based on the information on the future traffic situation and the automated driving capabilities of the different LoA.

2. The method of claim 1, wherein predicting information on the future traffic situation further comprises predicting the information on one or more present control commands of a remote driver operating the transportation vehicle in the remote driving mode, information on the remote driver, information on a planned route, and/or information on driving behavior of the remote driver.

3. The method of claim 1, wherein the handover duration comprises at least one of a reaction time of a remote driver operating the transportation vehicle in the remote driving mode, a communication latency of communication, and a reaction time of the transportation vehicle for switching from the remote driving mode to the automated driving mode.

4. The method of claim 1, further comprising determining, based on the information on the future traffic situation, a handover time and/or handover place for switching from the remote driving mode to the automated driving mode within the remote operation interval.

5. The method of claim 1, wherein the automated driving capabilities comprise one or more conditions for the future traffic situation, and wherein the switching from the remote driving mode to the automated driving mode comprises:
   determining in the remote operation interval a period for which the future traffic situation fulfills the one or more conditions based on the information on the future traffic situation; and
   deciding for or against switching from the remote driving mode to the automated driving mode based on a comparison of the handover duration with the period.

6. The method of claim 5, wherein the conditions comprise conditions for an acceleration, deceleration, speed, steering angle of the transportation vehicle, distance to one or more surrounding transportation vehicles, and/or a road profile in the traffic situation.

7. The method of claim 5, further comprising causing the transportation vehicle or requesting a remote driver to adapt driving parameters affecting the future traffic situation to fulfill the conditions within the remote operation interval.

8. The method of claim 1, wherein the predicting the information on the future traffic situation comprises predicting a plurality of future traffic situations and a comparison of the automated driving capabilities and the plurality of future traffic situations.

9. The method of claim 1, wherein the method is executed on a data processing circuit remote from the transportation vehicle.

10. The method of claim 1, wherein the switching from the remote driving mode to the automated driving mode to control the vehicle under automated control comprises deciding against switching from the remote driving mode to a manual driving mode of the transportation vehicle to enable manual control of the transportation vehicle.

11. A non-transitory computer readable medium including a computer program having program code for performing the method of claim 1, when the computer program is executed on a computer, a processor, or a programmable hardware component.

12. An apparatus comprising:
   one or more interfaces for communication; and
   a data processing circuit configured to control the one or more interfaces, wherein the data processing circuit and the one or more interfaces are configured to control remote operation of a transportation vehicle in a remote driving mode and at least partially automatic operation in an automated driving mode, wherein, in the remote driving mode, a current traffic situation is monitored using one or more sensors,
   wherein automated driving capabilities of the transportation vehicle are determined based on data related to a driving behavior of the transportation vehicle collected in an automated driving mode, wherein the automated driving capabilities represent circumstances under which the vehicle is able to take over the control safely, wherein the determination of the automated driving capabilities of the transportation vehicle comprises determination of automated driving capabilities of the transportation vehicle based on data related to the driving behavior for different levels of automation (LoA) of the transportation vehicle,
   wherein a future traffic situation based on information on the current traffic situation using a predefined motion model,
   wherein the future traffic situation is compared with the automated driving capabilities of the transportation vehicle,
   wherein a predicted quality of service (pQoS) of a communication link for the remote driving mode is determined, and based on the predicted quality of service, a remote operation interval for which the transportation vehicle is at least operable in the remote driving mode is obtained,
   wherein a handover duration for taking over control by the transportation vehicle for switching from the remote driving mode to the automated driving mode is obtained; and
   wherein the remote driving mode is switched to the automated driving mode to control the transportation vehicle remotely, wherein the switching is based on the information on the future traffic situation, the remote operation interval, and the handover duration, wherein the switching from the remote driving mode to the automated driving mode comprises selection of a LoA for the automated driving mode based on the information on the future traffic situation and the automated driving capabilities of the different LoA.

13. A transportation vehicle comprising the apparatus of claim 12.

14. An infrastructure component comprising the apparatus of claim 12.

15. The apparatus of claim 12, wherein the prediction of the information on the future traffic situation further comprises predicting the information on one or more present control commands of a remote driver operating the transportation vehicle in the remote driving mode, information on the remote driver, information on a planned route, and/or information on driving behavior of the remote driver.

16. The apparatus of claim 12, wherein the handover duration comprises at least one of a reaction time of a remote driver operating the transportation vehicle in the remote driving mode, a communication latency of communication, and a reaction time of the transportation vehicle for switching from the remote driving mode to the automated driving mode.

17. The apparatus of claim 12, wherein the data processing circuit and the one or more interfaces are further configured to determine, based on the information on the future traffic situation, a handover time and/or handover place for switching from the remote driving mode to the automated driving mode within the remote operation interval.

18. The apparatus of claim 12, wherein the automated driving capabilities comprise one or more conditions for the future traffic situation, and wherein decision for or against switching from the remote driving mode to the automated driving mode includes determination in the remote operation interval, a period for which the future traffic situation fulfills the one or more conditions based on the information on the future traffic situation, and decision for or against switching from the remote driving mode to the automated driving mode based on a comparison of the handover duration with the period.

19. The apparatus of claim 18, wherein the conditions comprise conditions for an acceleration, deceleration, speed, steering angle of the transportation vehicle, distance to one or more surrounding transportation vehicles, and/or a road profile in the traffic situation.

20. The apparatus of claim 18, wherein the data processing circuit and the one or more interfaces are further configured to cause the transportation vehicle or request a remote driver to adapt driving parameters affecting the future traffic situation to fulfill the conditions within the remote operation interval.

21. The apparatus of claim 12, wherein the prediction of information on the the future traffic situation comprises prediction of a plurality of future traffic situations and a comparison of the automated driving capabilities and the plurality of future traffic situations.

22. The apparatus of claim 12, wherein the apparatus is executed on a data processing circuit remote from the transportation vehicle.

23. The apparatus of claim 12, wherein the switching from the remote driving mode to the automated driving mode to control the vehicle under automated control comprises deciding against switching from the remote driving mode to a manual driving mode of the transportation vehicle to enable manual control of the transportation vehicle.

* * * * *